United States Patent [19]

Weege

[11] Patent Number: 5,294,142
[45] Date of Patent: Mar. 15, 1994

[54] ADJUSTABLE WHEELCHAIR

[75] Inventor: Rolf-Dieter Weege, Kalletal, Fed. Rep. of Germany

[73] Assignee: Meyra Wilhelm Meyer GmbH & Co. KG, Kalldorf, Fed. Rep. of Germany

[21] Appl. No.: 962,880

[22] Filed: Oct. 19, 1992

[51] Int. Cl.$^5$ .................... B60R 9/00; B62D 17/00
[52] U.S. Cl. ............... 280/304.1; 280/250.1; 280/661
[58] Field of Search ........... 280/304.1, 250.1, 661, 280/96.1; 297/DIG. 4

[56] References Cited

U.S. PATENT DOCUMENTS

| | | | |
|---|---|---|---|
| 774,042 | 11/1904 | Cooper | 280/661 |
| 4,405,142 | 9/1983 | Whetstine | 280/242 |
| 4,500,102 | 2/1985 | Haury et al. | 280/304.1 |
| 4,805,925 | 2/1989 | Haury et al. | 280/250.1 |
| 5,060,962 | 10/1991 | McWethy | 280/304.1 |
| 5,131,572 | 7/1992 | Robertson et al. | 280/304.1 |

FOREIGN PATENT DOCUMENTS 3517050 11/1986 Fed. Rep. of Germany.
3614726 11/1987 Fed. Rep. of Germany.

*Primary Examiner*—Margaret A. Focarin
*Assistant Examiner*—Kevin Hurley
*Attorney, Agent, or Firm*—Allegretti & Witcoff, Ltd.

[57] ABSTRACT

Adjustable wheelchair with a frame on whose sides the wheel axles of hand-driven rear wheels are mounted on mounts provided on the frame with a negative camber, i.e., closer together at top than at bottom. The mounts each have a mounting part in which there is an inclined bore hole holding the rear wheel axle in order to achieve the negative angle. The mounting parts 16 of the wheel axles 8 on both sides are arranged so they can rotate independently of each other in the respective mounts 6 and can be secured in any set rotational position. By releasing the mounts, the mounting parts can be rotated to change the direction of the rear wheels to eliminate toe-in or tow-out. Thus, any desired variation in the angle of the rear wheels is possible and/or any toe-in or toe-out tendency can be corrected.

9 Claims, 2 Drawing Sheets

ADJUSTABLE WHEELCHAIR

This invention concerns an adjustable hand-driven wheelchair in which the wheels are mounted on the frame with negative camber and includes means for adjusting the wheels to eliminate any undesired toe-in or toe-out.

PRIOR ART

European Patent 255,804 describes a wheelchair of the generic type with a frame, two rear wheels and two front wheels. The two rear wheels are connected by means of a rigid rear axle. The rear axle is connected at both ends by means of an adjustable mount to the frame and is equipped with a mason's bubble level for adjusting the angle. With the help of this bubble level the rear axle can be rotated in the mount (depending on the setting of the two front wheels) until the bubble is at the zero point, i.e., until the two rear wheels are exactly parallel in the rear wheel tracks. The two rear wheels are mounted by means of a floating axle in an end piece on the rear axle. The end piece has wheel axle receptacle bores in which there is no tolerance axially or radially. The wheel axle receptacle bores in the end pieces of the rear axle form an angle with the rear axle in order to maintain the desired wheel angle. There are several disadvantages to the known wheelchair. Several rear axles must be kept on hand and used for different angle settings. Manufacturing tolerances and especially deformation of the frame due to rough operation, e.g., a collision, results in an unwanted toe-in or toe-out of the rear wheels—especially different tracks for the two rear wheels. Such deformations can be compensated for with the known wheelchair design only by means of complicated repair work in a workshop.

German Patent OLS 3,742,547 discloses a wheelchair where the wheel mount is fixed permanently on the frame of the wheelchair. The mounting part has a row of vertically-shaped holes into which the axle of the respective wheel can be inserted and bolted in position at different levels so as to be able to adjust the slope of the seat. This is desirable, for example, when practicing a sport in the wheelchair. The mounting part is adjustable about a vertical axis so that changes in the toe-in tendency of the two wheels, i.e., their alignment relative to the direction of travel, can be adjusted and corrected. This requirement is based on the fact that because of the negative angle of the driven wheels, the toe-in tendency changes when there is an adjustment in the height of the axle when the axle is rigidly connected to the frame. With this known design the mounting part is held so it can be pivoted between two bolts that form the vertical pivot axis, in which case the pivot position is adjustable by means of two set screws that act on both sides of a part of the mount. This known design is very complicated in both design and handling.

THE INVENTION

The object of the present invention is to provide a wheelchair of the type described in which the rear wheel track or rear wheel angle can be corrected with little effort whether wheel misalignment is due to the height adjustment of the wheels, due to manufacturing defects and adjustments, or due to other factors.

According to this invention, the mounting parts can be rotated by loosening the mount segments and thus the direction of the wheel axles can be adjusted. The two mounting parts at each side of the frame can be turned independently of each other and thus the wheels can be turned in different directions. This makes it possible to compensate for any change in angle from the direction of travel caused by any factors. Thus, changes in angle—even irregular changes in angle of the rear wheels—caused by height adjustments, manufacturing defects or deformation of the frame, e.g., due to an impact—can thus be compensated for easily and with very little effort. If desired, the structure according to this invention also permits practically any desired change in the angle of the rear wheels and/or makes it possible to offset or correct any toe-in or toe-out effect.

According to one alternative form of this invention, the mounts on the frame are adjustable in height and/or horizontally.

According to another form of this invention, essentially the cylindrical axle support for the wheel axle is rotatable in a complementary recess in a base comprising part of the mount. The support has a flange that is secured by a collar bearing against the base, and an angular bore for receiving the wheel axle.

In one important embodiment of this invention, the mount has a connector which, with the adjacent base forms a vertical bore hole spaced from the axle mounting parts. The connector is divided across the axis of the cylindrical support in the area of the bore hole, and embraces an essentially vertical rod or tube of the wheelchair frame which tube extends through the bore hole. The divided connector and the adjacent axle mounting parts also have axial bore holes that are aligned with each other on the two sides of the vertical tube. Bolts passing through the holes secure the connector against the mount and tighten all parts of the mount with respect to each other. At the same time, the bolts secure both the cylindrical support for the axle of the wheel and the mount on the frame tube. In other words, after slightly loosening the bolts, the height of the chair can be adjusted, while at the same time the angle of the wheels is adjusted. This design is especially simple and easy to handle.

In order to prevent twisting of the mounts after they have been released and to assure that they will be aligned, it is expedient according to a refinement of this invention for the mounts for the two rear wheels to be connected by means of a rod.

THE DRAWINGS

This invention will now be illustrated in greater detail with reference to the figures.

Figure 1:
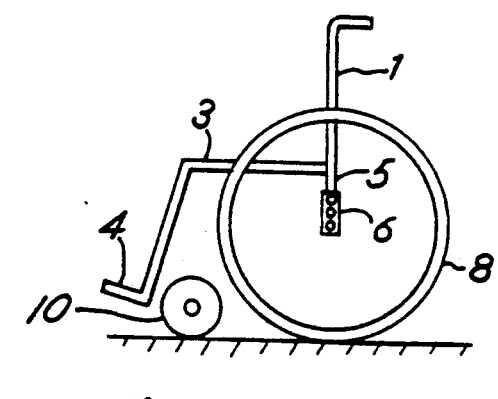
FIG. 1 shows a side elevational view of the wheelchair constructed according to this invention.
Figure 2:
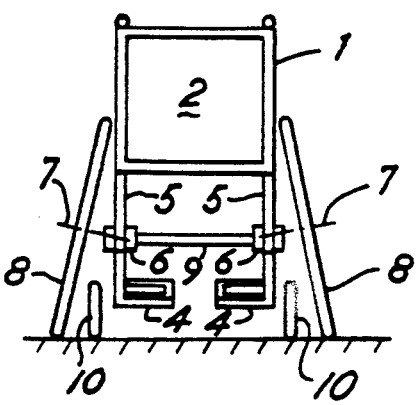
FIG. 2 is a rear elevational view.
Figure 3:
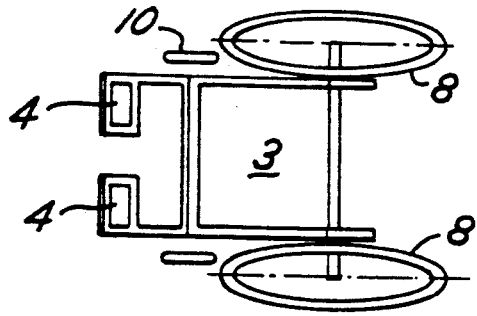
FIG. 3 is a plan view.
Figure 4:
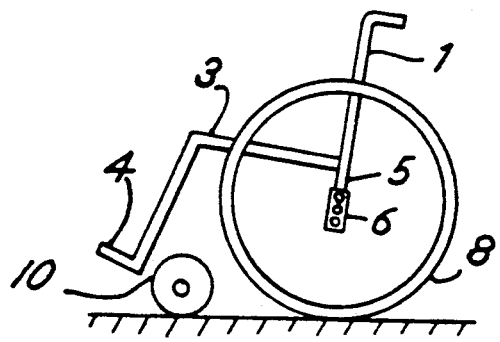
Figure 5:
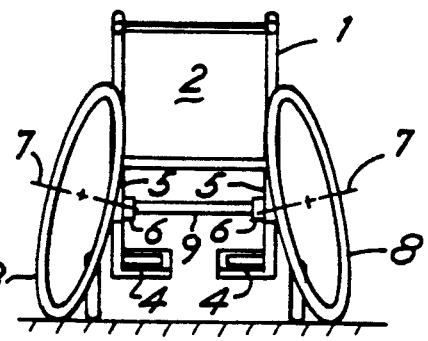
Figure 6:
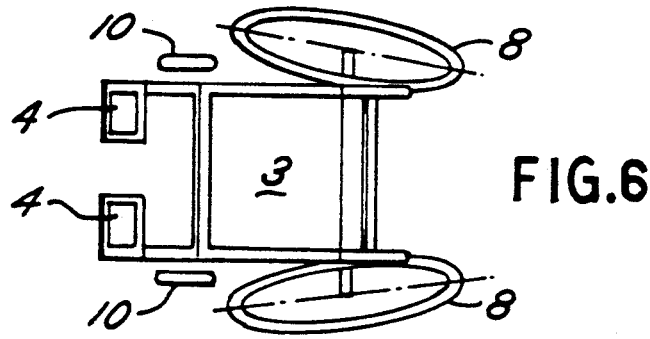

FIGS. 4, 5 and 6 correspond to FIGS. 1, 2 and 3 and show the position of the rear wheels after a height adjustment and before adjustment of the angle of the wheels.

Figure 7:
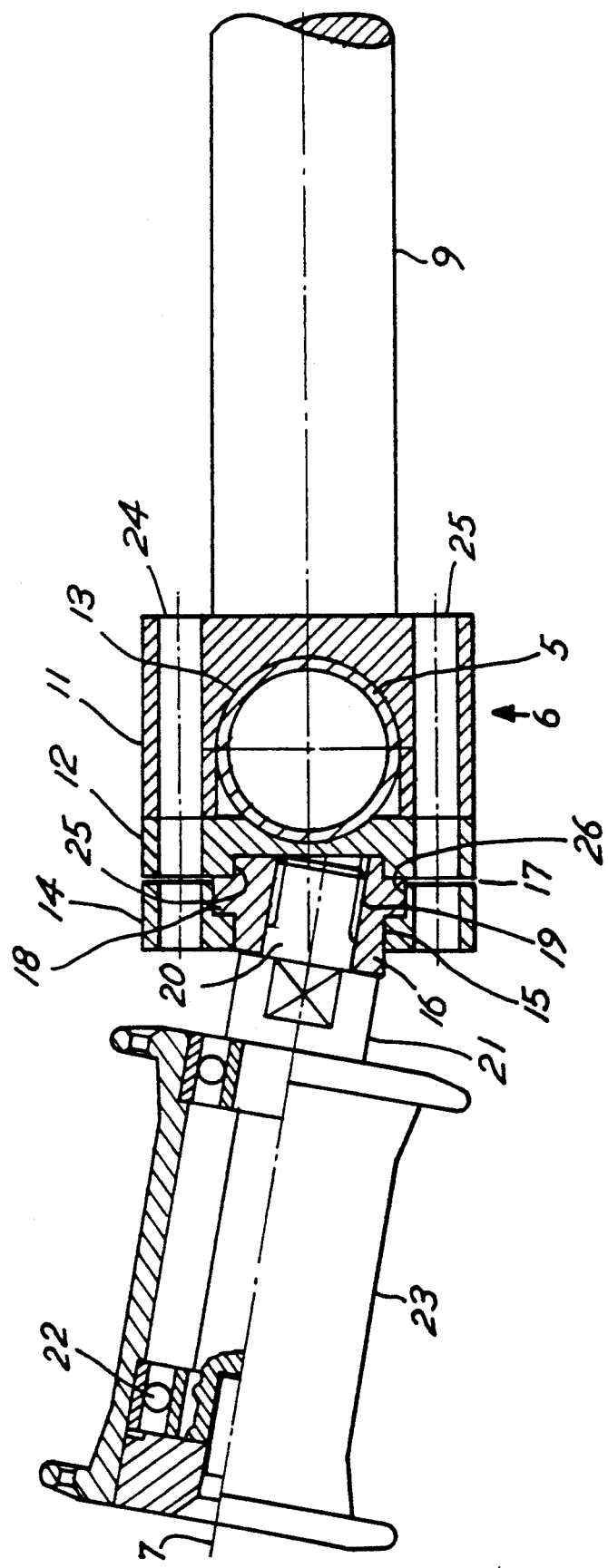

FIG. 7 is an enlarged detail of a horizontal section through FIG. 2 in the area of the hub and the mount of a rear wheel, with the hub rotated 90° to show the negative camber of the wheel.

DETAILED DESCRIPTION

FIG. 1 shows one embodiment of a wheelchair according to this invention from the side and FIG. 2 shows a view from the rear while FIG. 3 shows a view from above. The drawings are schematic. The wheelchair has a frame 1 with a back rest 2, a seat 3 and a foot rest 4. A mount 6 holding a wheel axle 7 for a rear wheel 8 is attached to frame tube 5 extending downward. Since the wheelchair has a symmetrical design, the parts on the two sides of the wheelchair have been provided with the same numbers. Mounts 6 are connected to each other by means of rod 9. Rod 9 may optionally be omitted. Front wheels 10 are provided in addition to rear wheels 8.

FIG. 4, 5 and 6 correspond essentially to FIGS. 1-3, but there is a difference inasmuch as mount 6 on tube 5 is shifted upward, so seat 3 is lowered in the rear area and thus has a downward slope toward the rear. In this position the user of the wheelchair will sit more securely on the seat which is desirable, for example, when playing sports with the wheelchair.

FIGS. 5 and 6 show that the wheel angle is changed due to the lowering of the seat. The rear wheels 8 have a toe-out effect so that the wheels tend to run apart when traveling straight ahead. Due to the toe-out effect, driving resistance increases, which is undesirable. For this reason it is expedient to realign the wheel axles of rear wheels 8 so they will run exactly straight ahead as in FIGS. 1-3. In order to accomplish this easily, mount 6 is designed according to this invention as shown in detail in FIG. 7, which is described below.

FIG. 7 shows an enlarged horizontal section through FIG. 2 in the area of mount 6 just above tie rod 9, namely in the area of mount 6 and wheel axle 7 of rear wheel 8. The wheel hub has been rotated 90° to show the negative camber. Mount 6 comprises a connector 11 and 12 that embrace verticals tube 5 and a collar 14 for securing cylindrical axle support 16 to base 12. A vertical bore hole 13 extends through all segments of mount 6 engaging the two parts 11 and 12 on tube 5 and clamping collar 14 to base 12.

Collar 14 has recess 15 including a groove 26, and base 12 has a central recess 25 for embracing cylindrical support 16 and its flange 18. The configuration of the recesses 15, 25 complement the profile of cylindrical support 16. Between base 12 and collar clamp 14, there is a small gap 17.

A threaded bore 19 is provided in support 16 into which a threaded stud on axle pin 21 is screwed. A hub 23 for rear wheel 8 is mounted on the axle pin by means of ball bearings 22. The bore 19 is inclined at a fixed angle to the axis of the cylindrical axle support 16.

Bore holes 24 and 25 extend through parts 11, 12, 14 to receive bolts (not shown). The bolts may be tightened to secure parts 11 and 12 of mount 6 on tube 5 and, to tighten collar 14 against part 12. Axle support base 16 is secured by means of flange 18 between parts 12 and 14.

To adjust the height and slope of seat 3, the bolts passing through bore holes 24 and 25 are loosened slightly so that mount 6 can then be shifted on vertical tube 5. Simultaneously axle support 16 can be turned in recess 15 to readjust the inclination and eliminate the toe-in. Then the bolts are tightened again so the wheelchair is ready to use immediately in the adjusted position.

Only a height adjustment of the rear wheels has been described with reference to the figures, but it is also possible to attach mounts 6 on longitudinal tubes 3 of frame 1 in order to permit a horizontal adjustment of the rear wheels. Furthermore, frame 1 can be designed so as to permit a height adjustment as well as a horizontal adjustment of the rear wheels.

In FIG. 7 the wheel axle 7 is shown as a screw axle. Instead of a screw axle, a floating axle may also be used such as those known in the state of the art.

I claim:

1. An adjustable wheelchair having a frame,
 a mount for a drive wheel connected to said frame at each side thereof, each mount comprising,
 a base,
 a cylindrical axle support rotatably mounted on said base,
 a bore in said axle support inclined at a fixed angle to the axis of said cylindrical axle support,
 an axle fixed in said bore for one of said wheels, and
 means for securing said cylindrical axle support in any rotational position for adjusting the camber of wheels mounted in said bores at each side of said frame.

2. Adjustable wheelchair of claim 1 mounts are vertically adjustable on said frame.

3. Adjustable wheelchair of claim 1 which includes a collar surrounding said axle support and in which said cylindrical axle support is mounted in complementary recesses in said base and said collar, and is adjustably clamped between said base and said collar by means detachably connecting said collar to said base.

4. Adjustable wheelchair of claim 3 in which cylindrical axle support has a peripheral flange disposed between said collar and said base.

5. Adjustable wheelchair of claim 3 in which said frame comprises vertical tubes at each side of said chair,
 each said mount has a connector adjacent said base forming with said base a vertical bore for receiving said vertical tube,
 said connector being divided across the axis of said vertical bore to provide a clamp embracing said tube,
 said securing means connecting said connector to said base and said collar.

6. Adjustable wheelchair of claim 3 in which said mounts at each side of said frame are connected together by a rod.

7. Adjustable wheelchair of claim 1 in which said inclined bore and said wheel are threaded to permit screwing said axle tightly into said bore.

8. Adjustable wheelchair of claim 5 in which said securing means comprises bolts extending through said collar, base and connector.

9. Adjustable wheelchair of claim 1 which includes a collar surrounding said axle support, said securing means comprising a part of said collar.

* * * * *